United States Patent [19]

Aduana

[11] Patent Number: 5,367,818
[45] Date of Patent: Nov. 29, 1994

[54] RETRACTABLE SNAGPROOF FISH HOOK SYSTEM

[76] Inventor: Efren M. Aduana, 3609 S. Francisco Ave., Chicago, Ill. 60632

[21] Appl. No.: 116,503

[22] Filed: Sep. 3, 1993

[51] Int. Cl.$^5$ .............................................. A01K 85/00
[52] U.S. Cl. .................... 43/42.44; 43/42.41
[58] Field of Search .................. 43/42.41, 42.44, 42.1, 43/42.4, 42.35

[56] References Cited

U.S. PATENT DOCUMENTS

| | | |
|---|---|---|
| 151,394 | 5/1874 | Huard et al. . |
| 1,537,266 | 5/1925 | Ryan ................................. 43/42.41 |
| 2,392,677 | 1/1946 | Lauby ............................... 43/42.41 |
| 2,424,096 | 7/1947 | Janchan ............................ 43/42.41 |
| 2,611,208 | 9/1952 | Alexath ............................ 43/42.41 |
| 3,411,233 | 11/1968 | Hopper . |
| 3,601,919 | 8/1971 | Nixon ................................. 43/21.2 |
| 4,020,583 | 5/1977 | Gatlyn . |
| 4,744,167 | 5/1988 | Steele . |
| 4,782,618 | 11/1988 | Rainey . |
| 4,827,656 | 5/1989 | Ohnishi . |
| 4,848,023 | 7/1989 | Ryder et al. . |

FOREIGN PATENT DOCUMENTS

| | | |
|---|---|---|
| 593798 | 3/1960 | Canada . |
| 0538500 | 1/1956 | Italy ................................. 43/42.41 |
| 0003027 | of 1888 | United Kingdom .............. 43/42.41 |
| 337479 | 11/1930 | United Kingdom . |

*Primary Examiner*—P. Austin Bradley
*Assistant Examiner*—James Miner
*Attorney, Agent, or Firm*—Richard C. Litman

[57] ABSTRACT

The present invention provides an improved retractable snag-proof fish hook system so that fisherman, whether trolling or fly fishing, may move their lure through any part of lake, stream, river, or other body of water without the hook of the lure becoming entangled and snagged upon underwater obstacles. The lure secures the hook within a chamber of the lure that is open to both the top and bottom surfaces of the lure. A biasing member forces the hook, which is pivotally secured within the chamber, against a stop wire so that only the rounded portion of the hook extends from the lure through the bottom opening. A barb located on the end of the hook is released from the chamber only when a fish bites onto the lure, pushing the rounded portion of the hook back into the lure, thus moving the barb end of the lure out of the lure and into the fish's mount, hooking the fish.

8 Claims, 5 Drawing Sheets

RETRACTABLE SNAGPROOF FISH HOOK SYSTEM

BACKGROUND OF THE INVENTION

1. Field of the Invention

The present invention relates to hooks and lures used in the sport of fishing. In particular, the present invention provides a hook and lure system that keeps a hook retained within a lure until the lure is enveloped within the mouth of a fish at which time the hook deploys, engaging the mouth of the fish.

2. Description of the Prior Art

Since the invention of the fish hook and the advent of the artificial lure, novice and professional fisherman alike have faced the dilemma of fish hooks and lures becoming entangled or snagged upon vegetation, reefs, and other natural or manmade objects beneath the water's surface. This occurs since fish, being predators, use obstacles in the water as camouflage when stalking and hunting other fish, thus in an attempt to catch the fish, a fisherman must expose his lure to the objects and vegetation beneath the water's surface. The fisherman is required to navigate his/her lure or hook through such obstacles when attempting to catch a fish. Due to the present design of most lures, the hook is exposed to the vegetation and other objects within the water, thus the incidence of the lure and hook becoming snagged and/or lost is quite high. For over a century, fisherman have tried to develop lures that would be less susceptible to becoming entangled in such underwater obstacles mentioned above.

A popular type of lure dating back to the late 1800's was a lure having a hook concealed within the body thereof. Such a lure would be able to be drawn through weeds and obstacles without becoming entangled therein. These lures were typically hollow having a spring biased, ratcheting mechanism for releasing the hook from the lure when the line to which the lure was attached was tensioned. U.S. Pat. No. 151,394, issued on May 26, 1874 to David Huard and Charles M. Dunbar, discloses trolling fish hooks having a center chamber therein housing a spring biased hook that is released from the lure when the line is tensioned, pulling a catch away from the barb end of the hook, releasing it from an opening located along the bottom portion of the lure.

Lures having spring biased hooks contained within a chamber and exit the lure through a single aperture may be seen in U.S. Pat. No. 3,411,233, issued on Nov. 19, 1968 to James H. Hopper, U.S. Pat. No. 4,782,618, issued on Nov. 8, 1988 to Jack D. Rainey, and Canadian Patent 593,798, issued in 1960 to Thomas G. Hodgson et al. Furthermore, U.S. Pat. No. 4,020,583, issued on May 3, 1977 to Jennings B. Gatlyn, discloses a snag-proof fishing lure in which the hook that is contained within the lure is in a passageway that extends fully through the lure from top to bottom. Although the rounded part of the hook extends from the lure, the barb of the hook itself does not extend from the lure until the line to which the lure is attached is tensioned.

In addition, other lure configurations include hooks carried within the lure itself. U.S. Pat. No. 4,827,656, issued on May 9, 1989 to Masaaki Ohnishi, discloses a lure plug in which the hook of the lure is not deployed until a fish bites down onto the lure. The hook within Ohnishi's lure is disposed within a slot that passes through the entire lure, top to bottom. In one embodiment, FIGS. 11(a) and 11(b), the hook is pivotally secured within a slot of the lure such that a rounded portion of the hook protrudes from the lure and is held in such a position by a tubular biasing member biasing. When a fish bites down onto the lure, the barb portion of the lure is then forced from the lure, into the mouth of the fish. U.S. Pat. No. 4,744,167, issued on May 17, 1988 to George Steele, and U.S. Pat. No. 4,848,023, issued on Jul. 18, 1989 to Francis E. Ryder et al., disclose lures that retain their hooks on the exterior, but in close proximity to the body of the lure, so that the hooks will not become entangled or snagged on underwater vegetation and objects. Lastly, Great Britain Patent No. 337,479, issued on Nov. 27, 1930 to Frank McLaughlin, discloses a lure having a hook retained thereagainst to prevent the inadvertent snagging thereof. McLaughlin's hook is released from the lure due to the wobbling of the lure.

Although the above patented lures attempt to address the problem of snagging and losing fish lures, they do not disclose or suggest the construction of the present invention nor the advantages that are associated with using the same. These differences are more fully identified in the latter portions of this specification. Simply, none of the above inventions and patents, taken either singly or in combination, is seen to describe the instant invention as claimed.

SUMMARY OF THE INVENTION

The present invention overcomes the shortcomings of the prior art by providing a lure that is both safer to handle and more efficient than those presented in the prior art of record. Many of the lures seen in the prior art show chambers within the lure for retaining the hook. A drawback to this design is that dirt and debris may flow into these chambers through the single, small aperture through which the hook leaves the lure, but does not flow out therefrom. Hence, when the chamber becomes clogged with dirt and other particles, the hook may experience difficulty leaving the chamber, thus resulting in a missed opportunity to catch a fish since the hook could not engage because it will stay within the lure. The resilient members used to bias the hook within the chamber may further be adversely affected by these dirt and other like particles, causing the resilient members to harden and become ineffective.

In addition, none of the above mentioned patented lures were seen as being capable of controlling and adjusting the biasing force upon the hook as well as having the capability of being retro-fitted onto existing lures.

Accordingly, it is a principal object of the invention to provide a fishing lure having stored therein a hook, biased by an adjustable tension biasing member, and held in a stored position within a slot, within the lure, by a stop wire, so that the hook is not exposed to the outside of the lure until a fish bites down upon the lure, deploying the hook.

It is another object of the invention to provide a lure that has an internally disposed hook that is held in place by a biasing assembly, the biasing assembly being capable of adjustment so that different biasing loads may be applied to the hook.

It is a further object of the invention to provide a pivotal hook with a lure in such a manner that the construction of the lure itself is not susceptible to side-to-side splitting often experienced when hooking large fish, by utilizing a laterally disposed fastening means when incorporating the hook within the lure.

Still another object of the invention is to provide a lure having a hook incorporated therein and a hook stop wire for safety reasons that prevents the hook from completely deploying from the lure.

Still a further object of the invention is to provide a kit, capable of making most lures into a snag-proof lure by providing a hook with fastening means, an adjustable biasing member with securing means, and a hook stop wire, that may be incorporated into a slot cut within the lure, provided that the lure is of large enough size to have a longitudinally disposed slot cut therethrough.

It is an object of the invention to provide improved elements and arrangements thereof in an apparatus for the purposes described which are inexpensive, dependable and fully effective in accomplishing its intended purposes, while constructed to be completely safe to individuals handling the same.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention provides fisherman with a new and improved fishing lure that is constructed so as not become entangled or snagged upon underwater objects and vegetation, resulting in the loss of the lure. The invention may be utilized within most any type of lure so that fisherman may still not be restricted to lures of only a few designs. Presented herein, is retractable snag-proof fish hook system 10 as seen in a typical lure, a lure utilizing multiple hooks, and as a kit that would allow individual fisherman to modify their own lures with retractable snagproof fish hook system 10, making them into snagproof lures.

Figure 1:
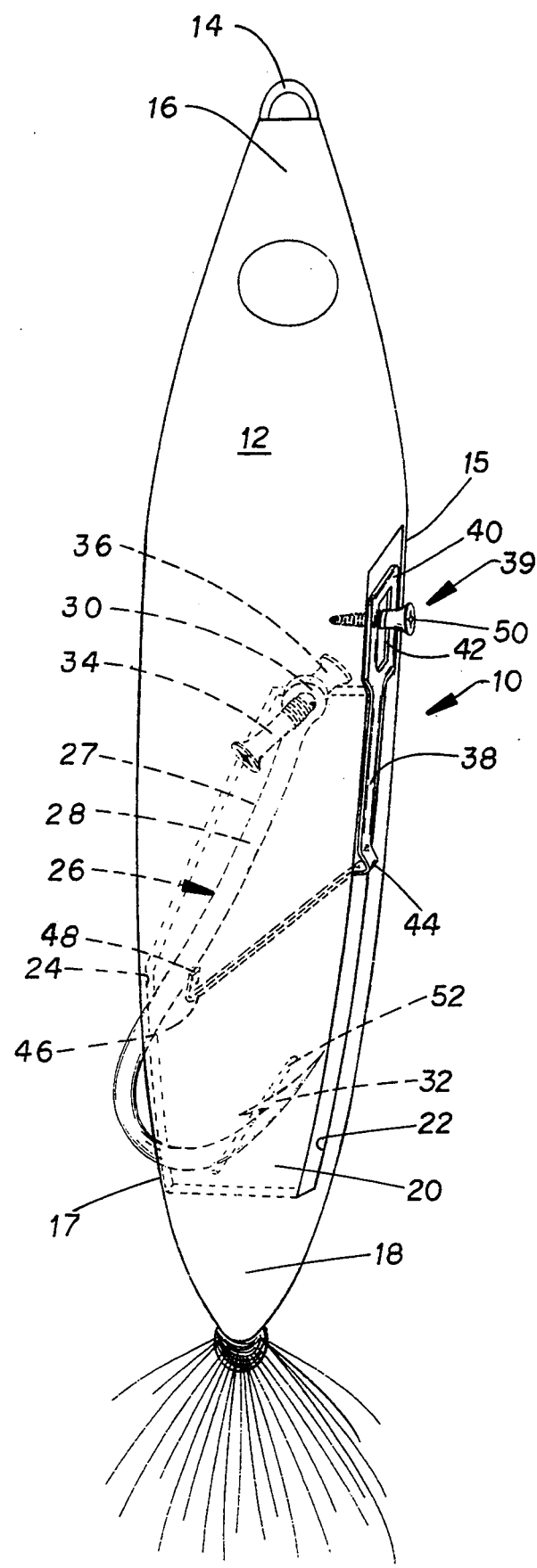
FIG. 1 is a perspective view of a retractable snag-proof fish hook system as incorporated into a lure.

FIG. 1 illustrates a standard lure 12 having line attachment means, a loop connector 14, at the front end 16 of lure 12 and a rear end 18 having a skirt connected thereto. In addition, lure 12 is seen as having a top surface 15 and a bottom surface 17. Within lure 12 is longitudinal chamber 20 having a top opening 22 along the entire length of chamber 20 and a bottom opening 24 approximately half the length of chamber 20 and located at the end of chamber 20 that is adjacent rear end 18 of lure 12.

Figure 2:
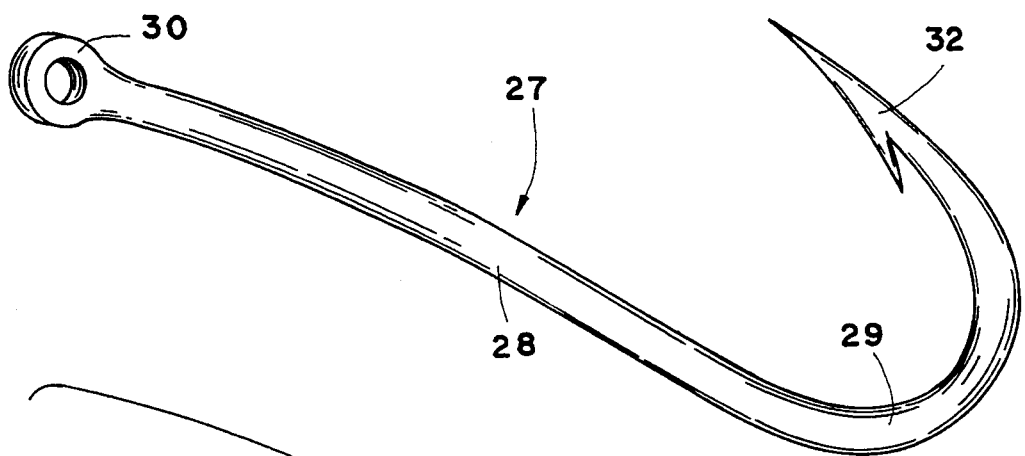
FIG. 2 is a perspective view of a hook used by the system.
Figure 3:
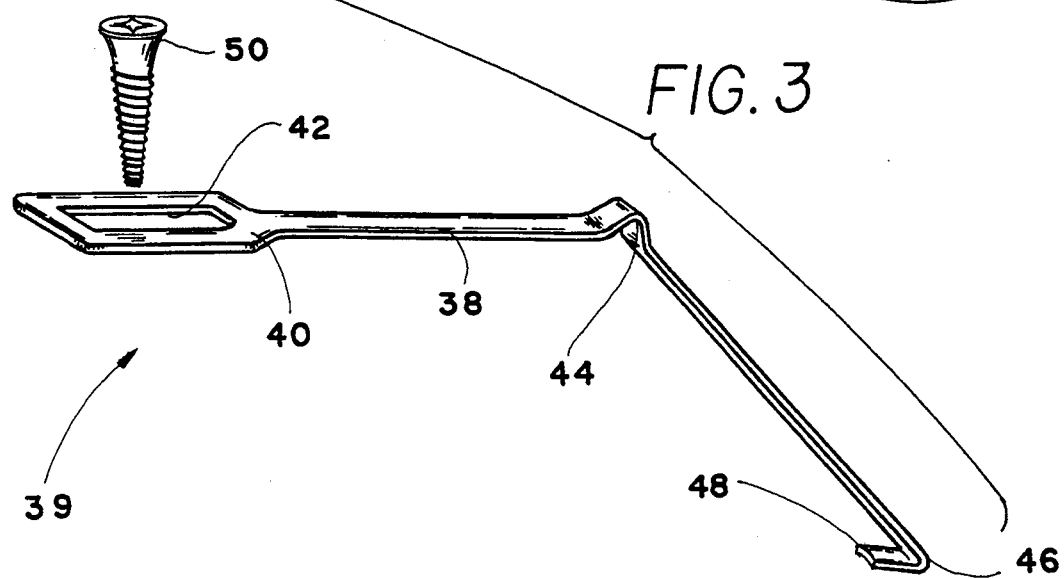
FIG. 3 is a perspective view of the biasing system utilized by the hook system.
Figure 4:
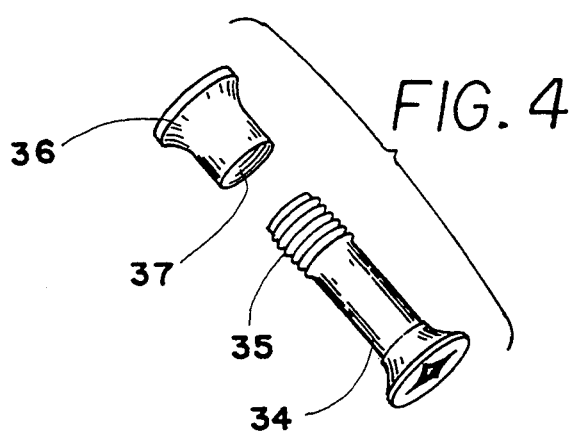
FIG. 4 is a perspective view of a threaded bolt member and end cap used to secure the hook within the lure.
Figure 5:
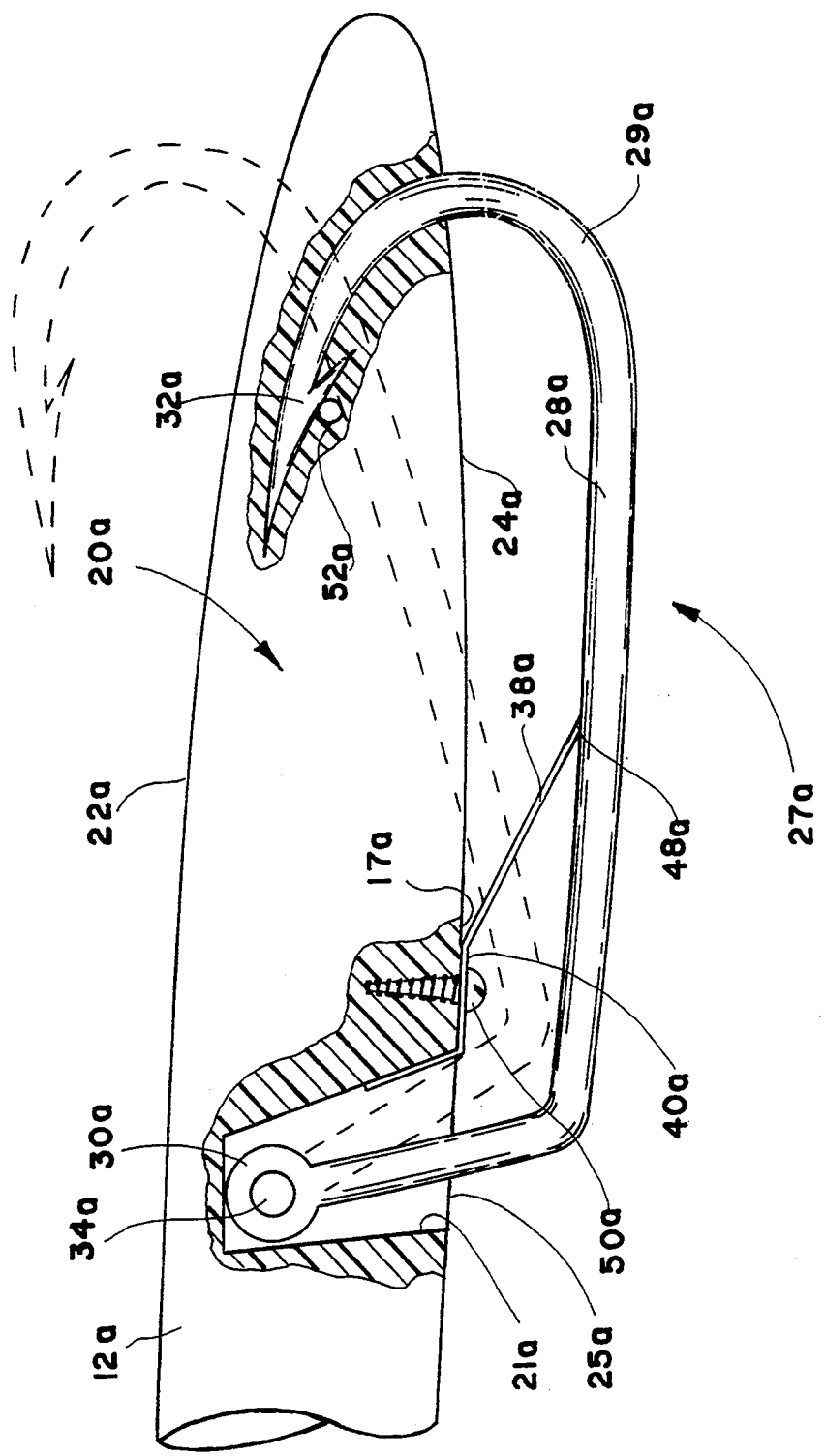
FIG. 5 is a cross-sectional view of an additional embodiment of the retractable snagproof fish hook system as incorporated into a second lure.

Individually illustrated in FIGS. 2, 3, and 4, and shown within a lure in FIGS. 1 and 5 are hook assembly 26 and biasing assembly 39. Hook assembly 26 comprises a J-shaped hook 27 having a main shaft 28, an eye 30 at one end and at least one barb 32 at the other end thereof extending from rounded portion 29 of hook 27. Threaded bolt member 34, having a partially threaded cylindrical outer portion 35 that is accepted by end cap 36 having an internally threaded portion 37, matingly scored to receive threaded cylindrical outer portion 35 of bolt member 34. Biasing assembly 39 comprises a leaf spring 38, constructed of semi-rigid, flexible materials, and threaded securing screw 50. Leaf spring 38 has a first end 40 shaped as a flat plate with a longitudinally disposed slot 42 therein and a second, bent end 46 with an arcuate hook engaging edge 48. In the approximate center of leaf spring 38 is an angular bend 44. When used within lure 12 in combination with a wire stop 52 a retractable snagproof fish hook system 10 is created.

The construction of retractable snagproof fish hook system 10 within lure 12 is as follows. Communicating with chamber 20 and positioned normal thereto, as well as on opposing sides thereof, are first and second cylindrical bores (not shown). Hook 27 is positioned within chamber 20 in such a manner that eye 30 of hook 27 is aligned between the first and second cylindrical bores and pivotally fastened therein by threaded bolt 34 and end cap 36. Hence, hook 27 is positioned with eye 30 in the end of chamber 20 closest to front end 16 of lure 12 and barb 32 of hook 27 is positioned with the end of chamber 20 near rear end 18 of lure 12. Supporting barb 32 of hook 27 within chamber 20 is stop wire 52. Stop wire 52 passes through chamber 20 and third and fourth cylindrical bores (not shown) and is secured at the outer ends of third and fourth cylindrical bores which are one the surface of lure 12. Third and fourth cylindrical bores are positioned normal to, and located on opposing sides, of chamber 20, communicating chamber 20 with the outside of lure 12. This hook 27 is supported within chamber 20 by threaded bolt 34 and stop wire 52, with the rounded portion 29 of hook 27 extending through bottom opening 24 of chamber 20.

Biasing assembly 39 is used to hold hook 27 in the above described position. Flat plate 40 of leaf spring 38 is secured to top surface 15 of lure 12 by threaded securing screw 50 which engages flat plate 40 through longitudinal slot 42. At the same time hook 27 is engaged by second, bent end 46 of leaf spring 38.

The interface between second, bent end 46 and main shaft 28 of hook 27 is arcuate edge 48. Arcuate edge 48 has approximately the same radius of curvature as main shaft 28 of hook 27. To control the strength of the biasing force on hook 27, biasing assembly 39 may be moved along slot 42 to different positions beneath the head of securing screw 50. Thus leaf spring 38 will have, in effect, a different length lever arm that will increase or decrease the force being applied to hook 27. In addition, should a largely different force be necessary to properly secure hook 27, a leaf spring 38 of different stiffness may be utilized.

Thus when lure 12 is placed upon a fishing line (not shown) and moved through the water and debris below the water, it will not become snagged upon vegetation or obstacles. Consequently, as a fish is attracted to lure 12 and takes in the same within its mouth, rounded portion 29 of hook 27 is pushed into chamber 20 thus moving barb 32 out through top opening 22 of chamber 20 engaging the mouth of the fish. As a safety feature, stop wire 52 now acts to prevent hook 27 from being completely moved out of chamber 20, through top opening 22, allowing hook 27 to be easily reset should hook 27 not catch the fish which has engulfed lure 12 within its mouth.

An alternative configuration for retractable snagproof fish hook system 10 is seen in FIG. 5. Lure 12a is seen having a first chamber 20a with top opening 22a and bottom opening 24a, now of equal length. A second chamber 21a having a single opening 25a retains eye 30a of hook 27a therein using threaded bolt member 34a and end cap 36a. Two cylindrical bores (not shown) one opposite sides of chamber 21a allow threaded bolt member 34a and end cap 36a to engage eye 30a of hook 27a in a similar manner to that described above. Leaf spring 38a is secured to the bottom surface 17a of lure 12a with threaded securing screw 50a in a similar manner to the first configuration previously discussed and holds hook 27a against stop wire 52a.

Figure 6:
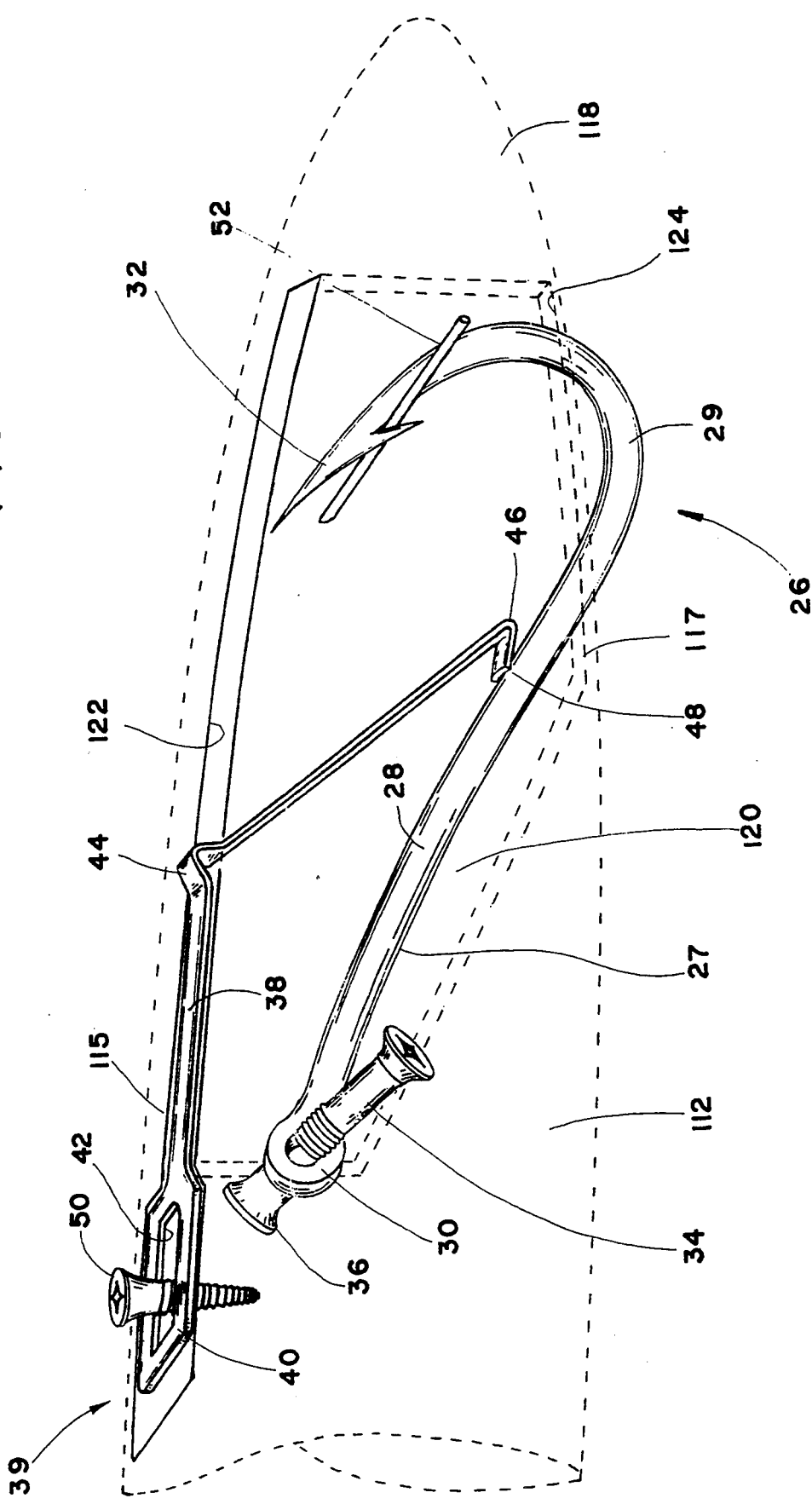
FIG. 6 is a perspective view of the retractable snag-proof fish hook system as incorporated into a pre-existing lure modified to accept the system.

Another advantage to the construction of hook assembly 26, biasing assembly 39, and stop wire 52 is that these components may be combined together and retrofitted into a pre-existing lure 112 (see FIG. 6). Provided that pre-existing lure 112 is of suitable size, a chamber 120, and a first, second, third, and fourth cylindrical bores (not shown) can be cut from pre-existing lure 112 so that hook assembly 26, biasing assembly 39, and stop wire 52 may be incorporated into pre-existing lure 112 creating a retractable snagproof fish hook system 10 from a pre-existing lure 112. This is accomplished as follows. Lure 112 is seen as having a top surface 115 and a bottom surface 117. Within lure 112 is longitudinal chamber 120 cut and removed therefrom having a top opening 122 cut along the entire length of chamber 120 and a bottom opening 124 approximately half the length of chamber 120 and located at the end of chamber 120 that is adjacent rear end 118 of lure 112.

Communicating with chamber 120 and positioned normal thereto, as well as on opposing sides thereof, are first and second cylindrical bores (not shown). Hook 27 is positioned within chamber 120 in such a manner that eye 30 of hook 27 is aligned between the first and second cylindrical bores and pivotally fastened therein by threaded bolt 34 and end cap 36. Hence, hook 27 is positioned with eye 30 in the end of chamber 120 furthest from the rear end 118 of lure 112 and barb 32 of hook 27 is positioned with the end of chamber 120 near rear end 118 of lure 112. Supporting barb 32 of hook 27 within chamber 120 is stop wire 52. Stop wire 52 passes through chamber 120 and third and fourth cylindrical bores (not shown) and is secured at the outer ends of third and fourth cylindrical bores which are on the surface of lure 112. Third and fourth cylindrical bores are positioned normal to, and located on opposing sides, of chamber 120, communicating chamber 120 with the outside of lure 112. This hook 27 is supported within chamber 120 by threaded bolt 34 and stop wire 52, with the rounded portion 29 of hook 27 extending through bottom opening 124 of chamber 120. Biasing assembly 39 is used to hold hook 27 in the above described position. Flat plate 40 of leaf spring 38 is secured to top surface 115 of lure 112 by threaded securing screw 50 which engages flat plate 40 through longitudinal slot 42. At the same time hook 27 is engaged by second, bent end 46 of leaf spring 38. The interface between second, bent end 46 and main shaft 28 of hook 27 is arcuate edge 48. Arcuate edge 48 has approximately the same radius of curvature as main shaft 28 of hook 27. To control the strength of the biasing force on hook 27, biasing assembly 39 may be moved along slot 42 to different positions beneath the head of securing screw 50. Thus leaf spring 38 will have, in effect, a different length lever arm that will increase or decrease the force being applied to hook 27. In addition, should a largely different force be necessary to properly secure hook 27, a leaf spring 38 of different stiffness may be utilized.

Figure 7:
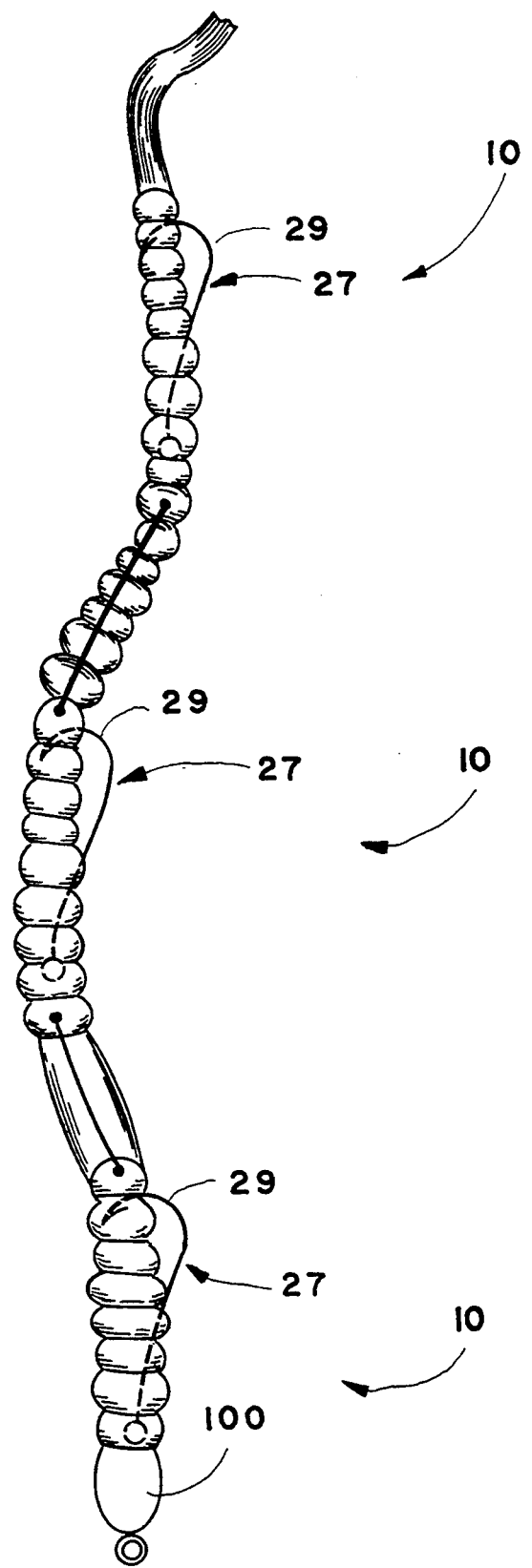
FIG. 7 is a side view of a third lure using three retractable snagproof fish hook systems therein.

Lastly, since a fisherman may fish for a variety of different fish, a lure utilizing any of the above configurations, that is the biasing assembly attached to either top surface 15 or bottom surface 17 of a lure or retro-fitted onto a pre-existing lure 112, it is in accordance with the inventor's intentions that a corresponding plurality of hook assemblies 26 . . . 26, biasing assemblies 39 . . . 39, and stop wires 52 . . . 52 may be incorporated into a single lure. This configuration is illustrated in FIG. 7 which discloses a lure 100 having three retractable snagproof fish hook systems 10 . . . 10 incorporated therein. Depending upon the configuration utilized, the above disclosed constructions of retractable snagproof fish hook systems 10 are utilized.

It is to be understood that the present invention is not limited to the sole embodiment described above, but encompasses any and all embodiments within the scope of the following claims.

I claim:

1. A retractable snag-proof fish hook system comprising:

a single lure having a front end with attachment means for accepting a fishing line and a distal, rear end opposite said front end, said lure having a longitudinally disposed chamber therein with means defining an opening at a top surface of said lure as well as means defining an opening at a bottom surface of the lure;

a hook assembly comprising a substantially J-shaped fish hook having an eye at one end, a main shaft, and at least one barb at the other end as well as fastening means to laterally engage said eye of said hook and first and second cylindrical bores, said first and second cylindrical bores positioned normal to, and on opposing sides of, said chamber within said lure, thus positioning said hook within said chamber normal to said fastening means, and between said first cylindrical bore, and said second cylindrical bore;

a biasing assembly comprising a planar leaf spring of flexible material, said leaf spring shaped at a first end into a flat plate having a longitudinal slot, said leaf spring having an angular bend in the approximate longitudinal center thereof, said leaf spring bent at a second end to engage said main shaft of said hook, biasing said hook towards said bottom opening of said chamber within said lure, said planar leaf spring secured to said top surface of said lure adjacent said top opening by securing means for engaging said longitudinal slot of said flat plate of said first end of said planar leaf spring, said securing means further engaging means for defining an aperture within said top surface of said lure, adjacent said top opening; and a stop wire laterally crossing said chamber of said lure adjacent said rear end, said wire secured through third and fourth cylindrical bores that pass through said lure and communicate with said chamber in such a manner that both said stop wire and said third and fourth cylindrical bores are positioned normal to said hook, said stop wire supporting said barb end of said hook while said biasing assembly is acting thereupon.

2. The retractable snag-proof fish hook system according to claim 1, wherein said fastening means for said hook comprises a threaded bolt member and an internal, matingly threaded cap for receiving said threaded bolt member.

3. The retractable snag-proof fish hook system according to claim 1, wherein said securing means utilized with said leaf spring comprises a threaded screw.

4. The retractable snag-proof fish hook system according to claim 1, wherein said second end of said leaf spring is arcuate along its lateral edge at the point where said second end engages said main shaft of said hook, said arcuate lateral edge having a radius of curvature approximately equal to the radius of curvature of said main shaft of said hook.

5. A retractable snag-proof fish hook system comprising:
   a lure having a front end with attachment means for accepting a fishing line and a distal, rear end opposite said front end, said lure having at least one longitudinally disposed chamber therein, said chamber having means for defining an opening at a top surface of said lure and means for defining an opening at a bottom surface of the lure;
   a hook assembly for placement within each said chamber, said hook assembly comprising a substantially J-shaped fish hook having an eye at one end, a main shaft, and at least one barb at the other end and fastening means for laterally engaging said eye of said hook and first and second cylindrical bores, said first and second cylindrical bores positioned normal to and on opposing sides of said chamber within said lure, thus positioning said hook within said chamber normal to said fastening means, and between said first cylindrical bore, and said second cylindrical bore;
   a biasing assembly for placement within each said chamber, said biasing assembly comprising a planar leaf spring of flexible material, said leaf spring shaped at a first end into a flat plate having a longitudinal slot, said leaf spring having an angular bend in the approximate longitudinal center thereof, said leaf spring bent at a second end to engage said main shaft of said hook, biasing said hook towards said bottom opening of said chamber within said lure, said planar leaf spring secured to said top surface of said lure adjacent said top opening by securing means which engage said longitudinal slot of said flat plate of said first end of said planar leaf spring, said securing means further engaging means defining an aperture within said top surface of said lure, adjacent said top opening; and
   a stop wire located within said chamber, said stop wire laterally crossing said chamber of said lure adjacent said rear end, said wire secured through third and fourth cylindrical bores that pass through said lure and communicate with said chamber in such a manner that both said stop wire and said third and fourth cylindrical bores are positioned normal to said hook, said stop wire supporting said barb end of said hook while said biasing assembly is acting thereupon.

6. The retractable snag-proof fish hook system according to claim 5, wherein said fastening means for said hook comprises a threaded bolt member and an internal, matingly threaded cap for receiving said threaded bolt member.

7. The retractable snag-proof fish hook system according to claim 5, wherein said securing means utilized along with said leaf spring comprises a threaded screw.

8. The retractable snag-proof fish hook system according to claim 5, wherein said second end of said leaf spring is arcuate along its lateral edge at the point where said second end engages said main shaft of said hook, said arcuate lateral edge having a radius of curvature approximately equal to the radius of curvature of said main shaft of said hook.

* * * * *